United States Patent [19]
O'Neill

[11] 3,993,880
[45] Nov. 23, 1976

[54] RESISTIVE BATTERY FEED FOR LINE CIRCUITS
[75] Inventor: John Francis O'Neill, Boulder, Colo.
[73] Assignee: Bell Telephone Laboratories, Incorporated, Murray Hill, N.J.
[22] Filed: Feb. 9, 1976
[21] Appl. No.: 656,189

[52] U.S. Cl. .......................... 179/170 D; 179/81 R
[51] Int. Cl.² ........................................... H04B 1/52
[58] Field of Search ............... 179/16 F, 16 E, 81 R, 179/170 NC, 170.8, 170 G, 84 R, 84 A, 170 D, 18 F, 18 FA, 1 C; 333/8, 32; 178/70 R, 68

[56] References Cited
UNITED STATES PATENTS

| | | | |
|---|---|---|---|
| 2,694,184 | 11/1954 | Rounds | 333/32 |
| 3,143,715 | 8/1964 | Martens et al. | 179/170 NC |
| 3,284,718 | 11/1966 | Becker | 333/32 |
| 3,288,937 | 11/1966 | Donaldson | 179/16 F |
| 3,309,608 | 3/1967 | Alford | 333/8 |
| 3,497,619 | 2/1970 | Babcock | 178/68 |

*Primary Examiner*—Thomas A. Robinson
*Attorney, Agent, or Firm*—Roy C. Lipton

[57] ABSTRACT

A line circuit, interconnecting a subscriber telephone line and a port circuit, includes shunt battery feed resistors of equal impedance together with resistors in series with the subscriber line and a further resistor connected to a point intermediate one battery feed resistor and the adjacent series line resistor. Each series line resistor has an impedance value equal to half the impedance value of the further resistor and forms a pad configuration that provides longitudinal balance and bilateral impedance matching. Stability declines, created by the bidirectional gain of an active hybrid used to overcome the insertion loss of the pad, are offset by stability improvements created through a reduced sensitivity to impedance variations in the subscriber line. Numerous other advantages result from the use of this pad configuration such as a reduction in size, weight and cost.

6 Claims, 2 Drawing Figures

RESISTIVE BATTERY FEED FOR LINE CIRCUITS

FIELD OF THE INVENTION

This invention relates to line circuits for connecting subscriber lines to port circuits, and more particularly, to passive battery feed networks contained therein.

DESCRIPTION OF THE PRIOR ART

Line circuits provide a number of functions including battery feed and line isolation in an environment that exposes the circuitry to longitudinal (common mode) noise and high voltage transients. Acceptable performance imposes a requirement that the contribution of the line circuit to instability be minimal. A line circuit that enjoys wide acceptance and usage is the simple arrangement wherein direct current (dc) is fed through a line supervision relay and windings of an isolation transformer to the two conductors of a subscriber line. This configuration generally satisfies the aforementioned functions in the described environment; but, certain drawbacks such as size, weight and cost attach to the use of these iron laden components. By having the battery feed current pass through a relay and a transformer the circuit becomes saddled with bulk.

Prior art discloses shunt resistive arrangements used to apply battery feed to the two conductors of the subscriber line to thus avoid the flow of dc through the transformer windings. This technique is used with an electronic supervision sensor instead of a line supervision relay to give a size, weight and cost advantage; but, such arrangements have inherently caused impedance mismatch problems. Battery feed resistors cannot be added in shunt with the two-conductor line without degrading the stability as viewed from either the port circuit looking toward the two-conductor line or from the two-conductor line looking toward the port circuit. Attempts to boost the shunt battery feed impedance and thereby improve stability include negative impedance converters which either expose active components to high voltage line conditions or require an additional transformer.

It is an object of this invention to provide battery feed and bilateral impedance matching functions at reduced size, weight and cost.

It is another object of this invention to maintain longitudinal balance and stability, and be impervious to high voltage line conditions.

It is a further object of this invention to improve stability of the subscriber line at frequencies above and below the normal speech band.

SUMMARY OF THE INVENTION

The present invention is characterized by a pair of line impedances of equal value, each line impedance connecting a shunt battery feed impedance to one conductor of the line and a further impedance connected in series with the port circuit to a point intermediate the line impedance and the battery feed impedance connected thereto. This forms a pad configuration to provide battery feed current to the line while maintaining longitudinal balance.

Simple passive resistors are used for the construction of the battery feed network; they provide unimpaired stability to both directions of signal transmission at all frequencies, and further, are virtually insensitive to—while buffering other circuits from—high voltage surges on the two-conductor line.

When all components are resistors, the value of the further resistor ($r$) is set equal to the sum of the impedance values of each line resistor ($r/2$) to render the pad symmetrical. When, for example, the pad is inserted between the port circuit and the two-conductor line, each having an input impedance $R_0$, matching is achieved by selecting impedance values that satisfy the relation $$R_o = r + \frac{R(R_o + 1)}{R + R_o + r}$$

where ($R/2$) is the impedance value of each battery feed resistor. Hybrid termination is thereby improved by the presence of a reliable terminating impedance, to both directions of signal flow, that constrains impedance variations to a narrow region centered at the nominal design value.

A transformer couples the signal currents between the line and port circuits. Isolation is thereby maintained for the protection of the port circuit from adverse conditions on the two-conductor line. A capacitor is used to interconnect the line circuit and the transformer to eliminate the flow of dc in its secondary winding thereby reducing the size, weight, and cost of the transformer. This capacitor further prevents the transformer from diverting battery feed current from the telephone.

The switchhook detection function is performed electronically; equal value high impedance resistors, interconnecting the detector with the line circuit at the points intermediate each battery feed impedance and line impedance connected thereto, maintain longitudinal balance and adequate isolation from high voltage line conditions.

The foregoing and other objects and features of this invention will be fully understood from the following description of an illustrative embodiment taken in conjunction with the accompanying drawings.

DETAILED DESCRIPTION

Figure 1:
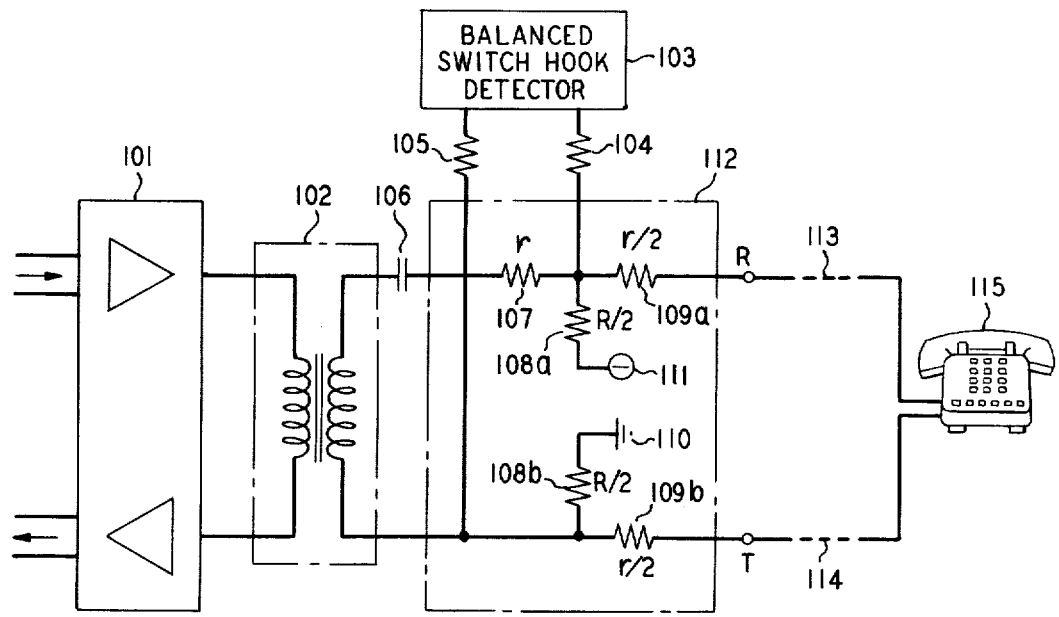
FIG. 1 illustrates a battery feed network, positioned in a line circuit in accordance with this invention, interconnecting a port circuit and a subscriber line.

FIG. 1 shows subscriber station 115 connected to battery feed network 112 by way of line conductors 113 and 114. The battery feed network 112 interconnects line conductors 113 and 114 to transformer 102 which isolates the line conductors from port circuitry which principally comprises hybrid 101, which may be of the type shown in U.S. Pat. No. 3,828,146 issued to T. G. Lewis and dated Aug. 6, 1974. The active hybrid circuit electrically separates and amplifies each direction of signal transmission. Hybrids maintain directionality of amplification to speech currents to the extent that the signal source impedance and the hybrid terminating impedance are equal. When these impedances are not matched to the design expectation, a reflection of the incident signal will occur. This condition leads to oscillation when other amplifiers in the same overall circuit exhibit similar reflections; when other amplifiers are not present the result is merely an echo. Stability is a measure of the additional amplification required to produce oscillation in a particular circuit; it is a figure of merit referred to throughout the text.

The battery feed network performs the principal function of supplying power to the subscriber station in the form of dc. It is further necessary to know whether the subscriber station is in an on-hook or off-hook state. Switchhook detector 103 makes this determination by sensing the flow of dc in the line conductors. A detection device is used, similar to the one shown in U.S. Pat. No. 3,622,709, issued to G. S. Tjaden, dated Nov. 23, 1971.

In FIG. 1, when subscriber station 115 goes off-hook a low impedance direct current path through that station is created; subscriber line 113 is joined to line 114. Battery current then flows (in the positive sense) from the ground point 110 through resistors 108*b* and 109*b*, line 114, subscriber station 115, line 113, resistors 109*a* and 108*a* into the negative battery return 111. Blocking capacitor 106 does not permit dc to flow through the secondary winding of transformer 102. The lack of a net direct current through the transformer eliminates the possibility of saturation and thereby allows the use of a small transformer.

A longitudinal balance problem occurs when, for example, an external electromagnetic field is impressed on lines 113 and 114; the electrical potential of these lines is thereby jointly raised or lowered. This condition would cause a voltage difference across subscriber station 115 if different currents flowed in lines 113 and 114 due, for example, to each line conductor having a different impedance. This phenomenon is referred to as the conversion of longitudinal noise into metallic noise. The instant invention avoids this problem by requiring resistors 108*a* and 108*b* to be equal, and by requiring resistors 109*a* and 109*b* to be equal. The total impedance of resistors 108*a* plus 109*a* is rendered equal to the total impedance of resistors 108*b* plus 109*b*; longitudinal balance is thereby maintained in the battery feed network.

Switchhook detector 103 is located in such a fashion so as not to disturb longitudinal balance. Through the use of equal value high impedance resistors 104 and 105 not only is longitudinal balance preserved but switchhock detector circuitry is protected against high voltage conditions on the line conductors.

For reasons of stability it is important that the battery feed network match the impedance of the circuitry with which it interfaces. Since the equivalent circuit of the pad is geometrically symmetrical and since equal impedances interface either side of the pad, the pad must be electrically symmetrical to achieve the required impedance match. This imposes the constraint that the impedance of resistor 107 be equal to the sum of the impedances of resistors 109*a* plus 109*b*. A further constraint on the impedance value of all resistors can be imposed to secure a match to any specific impedance.

For reasons of stability it is important that the impedance presented by hybrid 101 by the line conductors be nearly constant. The impedance of the line conductors, looking toward subscriber station 115, is termed the characteristic line impedance and is defined to be $R_0$. If this impedance is allowed to vary substantially from a fixed nominal value, the ability of the hybrid to distinguish one direction of transmission from the other will be impaired. This condition can be aggravated in a number of ways that ultimately result in self oscillation. One of the ways to degrade stability is to increase the hybrid gain while keeping all other factors equal. It would then appear that the insertion of a lossy network would require a boost in the hybrid gain and possibly result in a stability decrease. It will now be shown that the instant invention improves stability by desensitizing the hybrid to impedance variaions of the line conductors and that this offsets the de-stabilizing effects of a boost in hybrid gain, resulting in no net change in stability margin.

An equivalent circuit of the battery feed network of FIG. 1 is a symmetrical "Tee" pad comprising a vertical resistor of value R connected to the point intermediate two series resistors, each having a value $r$. In order to satisfy the constraint that the battery feed network have an input and output impedance equal to $R_0$ when connected between source and terminating impedances of $R_0$, it is only necessary to satisfy the following equation:

$$R_0 = r + \frac{R(R_0 + r)}{R + R_0 + r} \tag{1}$$

This equation is easily generalized to handle reactive components; the load impedance is set equal to the complex value of the source impedance. Any specific solution to Equation (1) will result in a network having a unique insertion loss. If, for example, a net loss of 6 dB is specified by the constraint that the output voltage be one-half of the input voltage when the network is inserted between a voltage of source impedance $R_0$ and terminated in a load impedance $R_0$, the following relationship is derived:

$$\frac{1}{2} = \frac{RR_0}{r^2 + rR_0 + 2rR + RR_0} \tag{2}$$

Jointly satisfying equations (1) and (2) gives values for resistors R and $r$ $$R = \frac{4}{3} R_0 \tag{3}$$

$$r = \frac{R_0}{3} \tag{4}$$

Figure 2:
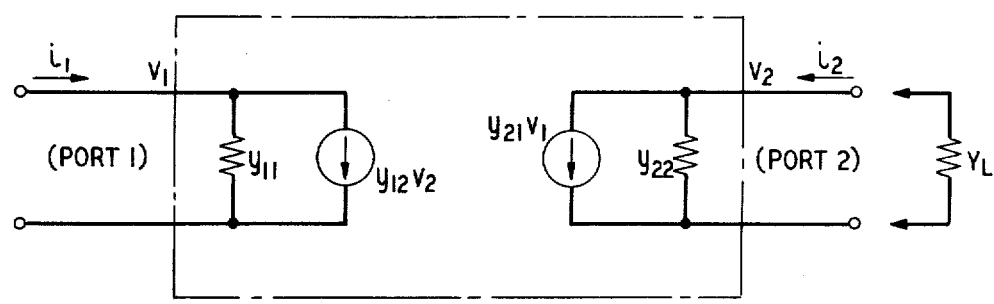
FIG. 2 illustrates the equivalent Y-parameter model of the battery feed network.

FIG. 2 represents the Y-parameter model of a network terminated in admittance $Y_L$. The following definitions apply to this two port network:

$v_1, v_2$ = voltages at port 1 of the network
$i_1, i_2$ = currents into port 1, port 2 of the network
$y_{in}$ = input admittance $$\left[\frac{i_1}{v_1}\right]$$

measured at port 1 with the load admittance $Y_L$ applied to port 2
$Y_{11}$ = input admittance $$\left[\frac{i_1}{v_1}\right]$$

measured at port 1 with a short circuit applied to port 2
$y_{22}$ = output admittance $$\left[\frac{i_1}{v_2}\right]$$

measured at port 2 with a short circuit applied to port 1

$y_{12}$ = transfer admittance $$\left[\frac{i_1}{v_1}\right]$$

measured with voltage $v_2$ applied to port 2 and a short circuit applied to port 1

$y_{21}$ = transfer admittance $$\left[\frac{i_2}{v_1}\right]$$

measured with voltage $V_1$ applied to port 1 and a short circuit applied to port 2.

The approach is to show that in order that both directions of hybrid transmission make up the loss of the pad, the hybrid gain must be increased by $$\left[\frac{v_2}{v_1}\right]^2.$$

Furthermore, it will be shown that $$\left[\frac{v_2}{v_1}\right]^2$$

is exactly the decrease in sensitivity of $y_{in}$ to variations of $Y_L$. Hence, the net effect on stability is a cancellation of the first order considerations. The following equations can be written by inspection of FIG. 2:

$$i_1 = y_{11}v_1 + y_{12}v_2 \quad (5)$$

$$0 = y_{21}v_1 + (y_{22} + Y_L)v_2. \quad (6)$$

The insertion loss is determined by calculating $v_2/v_1$ when the network is terminated in output admittance $Y_L$. From equation (6) the resultant loss through the network is $$\frac{v_2}{v_1} = \frac{-y_{21}}{y_{22} + Y_L} \quad (7)$$

This result is set aside for a later comparison and we proceed to obtain a relation between the input admittance and the terminating admittance so that the sensitivity between these parameters can be examined. Combining equations (5) and (6) to eliminate the $v_2$ variable yields:

$$i_1 = v_1\left[y_{11} - \frac{y_{12}y_{21}}{y_{22} + Y_L}\right] \quad (8)$$

hence $$y_{in} = \frac{i_1}{v_1} = y_{11} - \frac{y_{12}y_{21}}{y_{22} + Y_L}. \quad (9)$$

The variation of the input admittance with respect to the terminating admittance is determined by examination of the first derivative of equation (9):

$$\frac{dy_{in}}{dY_L} = \frac{y_{12}y_{21}}{(y_{22} + Y_L)^2} = \left[\frac{v_2}{v_1}\right]^2. \quad (10)$$

Since the network is bilateral, $y_{12} = y_{21}$; equation (10) shows that the multiplying factor for reducing sensitivity due to the insertion of the network equals the gain $$\left[\frac{v_2}{v_1}\right]^2$$

required to offset each direction of the network's loss [see equation (7)]. Hence, disregarding any second order effects, the resistive battery feed network does not change the net sensitivity of the hybrid to variations in the load admittance. This can be restated to say that hybrid balance or stability is preserved.

Beyond the basic operation as just described, it must be pointed out that the subscriber lines 113 and 114 are not always directly terminated in a simple telephone instrument over passive lines as shown. Rather, a hybrid may be used as part of an off-premises PBX circuit to a distant city utilizing four-wire transmission facilities; the subscriber line may alternatively require a bidirectional repeater. In either of these cases the stability of the subscriber line circuit now becomes an important consideration.

Many battery feed arrangements exhibit a significant impedance change outside the signal frequency band. This naturally arises from the inductive and capacitive elements of the circuit. The buffering offered by the pure resistance of the battery feed network of the instant invention constrains the impedance variation to a narrow range in the neighborhood of the nominal design value $R_0$ regardless of frequency. When hybrids or negative impedance converters are part of the subscriber line, the impedance into which they are designed to operate needs to be nearly constant over the entire frequency range for good stability. The instant invention provides this benefit.

Although a specific embodiment of this invention has been shown and described, it will be understood that various modifications may be made without departing from the spirit of the invention.

What is claimed is:

1. A line circuit connecting a two-conductor line across a two-terminal port circuit including a pair of battery feed impedances of equal value, each supplying a dc source to one line conductor

CHARACTERIZED BY a pair of line impedances of equal value each connecting one battery feed impedance to a corresponding line conductor;

a further impedance connected in series with one terminal of the port circuit and a point intermediate one of the line impedances and the battery feed impedance connected thereto, and a connection between the other terminal of the port circuit and a point intermediate the other line impedance and the battery feed impedance connected thereto, whereby there is formed a longitudinally balanced pad delivering battery feed current to the two-conductor line.

2. A line circuit in accordance with claim 1 wherein the impedance value of each battery feed impedance ($Z_b/2$), and the impedance value of each line impedance ($Z_l/2$), and the impedance value of the further impedance $Z_f$ are related to the input impedance $Z_S$ of the port circuit and the input impedance $Z_0$ of the two-conductor line by the following constraints:

$$Z_s = Z_l + \frac{Z_b(Z_f + Z_0)}{Z_b + Z_f + Z_0} ; \text{ and}$$

$$Z_0 = Z_l + \frac{Z_b(Z_f + Z_s)}{Z_b + Z_f + Z_s}$$

and
whereby the recited structure together with the formulated constraints provides impedance matching to signal currents in both directions.

3. A line circuit according to claim 1 wherein the impedance value of the further impedance is equal to the sum of the impedance values of the line impedances whereby the pad is rendered symmetrical.

4. A line circuit according to claim 2 wherein the line impedances, the battery feed impedances, and the further impedance are resistors.

5. A line circuit according to claim 1 further comprising a transformer secondary winding connected across the two-terminal port circuit and a capacitor connected in series with the transformer secondary winding and the further impedance whereby line isolation is maintained and the flow of dc in the secondary winding is eliminated.

6. A line circuit according to claim 1 further comprising a switchhook detector with two input terminals for sensing the flow of battery feed current, a first impedance of high value relative to other components within the pad, connecting one input terminal to a point intermediate one of the line impedances and battery feed impedance connected thereto, and a second impedance, equal in value to the first, connecting the other input terminal to a point intermediate the other line impedance and battery feed impedance connected thereto.

* * * * *

UNITED STATES PATENT AND TRADEMARK OFFICE
CERTIFICATE OF CORRECTION

PATENT NO. : 3,993,880
DATED : November 23, 1976
INVENTOR(S) : John Francis O'Neill It is certified that error appears in the above-identified patent and that said Letters Patent are hereby corrected as shown below:

In the specification, column 2, line 10, "+ 1" should read --+ r--. In the claims, column 7, line 8, "$Z_S$" should read --$Z_0$--; column 7, line 9, "$Z_0$" should read --$Z_S$--.

Signed and Sealed this

Second Day of October 1979

[SEAL]

Attest:

RUTH C. MASON
Attesting Officer

LUTRELLE F. PARKER
Acting Commissioner of Patents and Trademarks